(12) United States Patent
Schmitt et al.

(10) Patent No.: US 7,938,446 B2
(45) Date of Patent: May 10, 2011

(54) VEHICLE BODY OF A CONVERTIBLE VEHICLE

(75) Inventors: Hans-Jürgen Schmitt, Muehlacker (DE); Ali Oezkan, Leonberg (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 12/558,155

(22) Filed: Sep. 11, 2009

(65) Prior Publication Data

US 2010/0084843 A1 Apr. 8, 2010

(30) Foreign Application Priority Data

Oct. 4, 2008 (DE) .......................... 10 2008 050 129

(51) Int. Cl.
*B60R 21/13* (2006.01)
(52) U.S. Cl. ........................ 280/756; 296/102
(58) Field of Classification Search .................. 280/756; 296/102, 193.02, 193.06
See application file for complete search history.

(56) References Cited

U.S. PATENT DOCUMENTS

| | | | | |
|---|---|---|---|---|
| 4,854,628 A * | 8/1989 | Halberg | ............................ | 296/3 |
| 4,900,058 A * | 2/1990 | Hobrecht | ...................... | 280/756 |
| 5,000,480 A * | 3/1991 | Straka et al. | .................. | 280/756 |
| 5,622,382 A * | 4/1997 | Zepnik et al. | ................. | 280/756 |
| 5,671,947 A | 9/1997 | Henn | | |
| 5,848,715 A * | 12/1998 | Duncan | .......................... | 212/180 |
| 6,443,517 B1 | 9/2002 | Just et al. | | |
| 7,032,927 B1 * | 4/2006 | Joranlien | ....................... | 280/756 |
| 7,481,476 B2 * | 1/2009 | Heiss et al. | .................. | 296/24.43 |
| 7,578,523 B2 * | 8/2009 | Kosuge et al. | ................ | 280/756 |
| 2008/0061542 A1* | 3/2008 | Froschle et al. | ............. | 280/756 |

FOREIGN PATENT DOCUMENTS

| | | |
|---|---|---|
| DE | 8523831 U1 | 10/1985 |
| DE | 4412108 C1 | 11/1995 |
| DE | 4444894 A1 | 6/1996 |
| DE | 19501584 A1 | 7/1996 |
| DE | 10218701 C1 | 6/2003 |
| DE | 102004016362 A1 | 10/2004 |
| EP | 1084914 A2 | 3/2001 |
| EP | 1203679 B1 | 8/2006 |
| GB | 2376212 A | 12/2002 |

OTHER PUBLICATIONS

German Search Report dated Jun. 30, 2009.

* cited by examiner

*Primary Examiner* — Toan C To

(57) ABSTRACT

In order to reinforce a rear part of a convertible vehicle, reinforcement elements are provided on both sides on a rollover protection device. The reinforcement elements are composed, at the rear side of the device when viewed in the direction of travel, of at least two diagonal struts which extend toward one another. Further reinforcement elements are composed, at the front side of the device when viewed in the direction of travel, of at least two lateral stays which are arranged diverging from one another. The diagonal struts and the stays are secured supported on the vehicle body.

12 Claims, 7 Drawing Sheets

VEHICLE BODY OF A CONVERTIBLE VEHICLE

CROSS-REFERENCE TO RELATED APPLICATION

This application claims the priority, under 35 U.S.C. §119, of German application DE 10 2008 050 129.8, filed Oct. 4, 2008; the prior application is herewith incorporated by reference in its entirety.

BACKGROUND OF THE INVENTION

Field of the Invention

The invention relates to a vehicle body of a convertible vehicle having a rollover protection device which is disposed running transversely and is secured supported on the vehicle body.

In convertible vehicles, the absence of a roof as a reinforcing component means that the torsional strength of the bodywork is usually provided by a reinforced floor assembly of the vehicle. Additional reinforcement elements are necessary to ensure optimum torsional strength.

European patent EP 1 203 679 B1, corresponding to U.S. Pat. No. 6,443,517, discloses a convertible vehicle in which a rollover bar with a transverse member and a soft top storage compartment forms a coherent, permanently connected structural unit which is integrated into the vehicle body and which improves the strength of the convertible vehicle.

Furthermore, European patent EP 1 084 914 B1 discloses a component assembly for a convertible vehicle which contains an extendable rollover protection device which forms a load-bearing part and a torsion-reducing part of the bodywork.

SUMMARY OF THE INVENTION

It is accordingly an object of the invention to provide a vehicle body for a convertible vehicle that overcomes the above-mentioned disadvantages of the prior art devices of this general type, in which additional reinforcements can be integrated into an existing convertible concept in order to selectively provide torsional strength of the bodywork at least in the region of a rollover protection device.

With the foregoing and other objects in view there is provided, in accordance with the invention, a vehicle body configuration for a convertible vehicle. The vehicle body configuration contains a vehicle body, reinforcing elements, and a rollover protection device disposed running transversely and secured supported on the vehicle body. The rollover protection device is connected on both sides to the reinforcement elements. The reinforcement elements are composed, at a rear side of the rollover protection device when viewed in a direction of travel, of at least two diagonal struts extending toward one another. The reinforcement elements are further composed, at a front side of said rollover protection device when viewed in the direction of travel, of at least two lateral stays disposed diverging from one another. The diagonal struts and the lateral stays are connected supported on the vehicle body.

The advantages which are mainly achieved with the invention are that increased torsional strength of the bodywork is achieved by simply mounting reinforcement elements at the front side and rear side of the rollover protection device.

This is achieved in particular by virtue of the fact that the rollover protection device is connected on both sides to reinforcement elements. The reinforcement elements are composed, at the rear side of the device when viewed in the direction of travel, of at least two diagonal struts which extend toward one another, and further reinforcement elements are composed, at the front side of the device when viewed in the direction of travel, of at least two lateral stays which are arranged diverging from one another. The diagonal struts and the lateral stays are connected supported on the vehicle body. Since the diagonal struts and the lateral stays run approximately in the same direction in vertical oblique planes which are oriented from the outside of the vehicle as far as the direction of the longitudinal central axis of the vehicle, a force profile extending transversely through the vehicle to the respective opposite side of the vehicle is obtained.

According to a further embodiment of the invention, the lateral stays are arranged running obliquely outward in a v shape from the rollover protection device as far as a B pillar of the vehicle body, wherein the free ends of the lateral stays are secured both to the rollover protection device and to the B pillar, in each case by a fitting.

In addition, the lateral stays extend obliquely downward from the attachment in the fitting on the rollover protection device to the base of the B pillar, of the vehicle body. Furthermore, there is provision that the fitting for attaching the lateral stays is arranged on the rollover protection device, at half the height of the rollover protection device, and at the side edge. The oblique orientation of the rollover protection device as far as the base of the B pillar of the bodywork produces an optimum reinforcement effect in terms of avoiding torsion, since the forces which occur can be applied directly from the base of the B pillar into the other side of the vehicle body.

The diagonal struts which are arranged at the rear side of the rollover protection device extend from the side section or the side edge of the rollover protection device obliquely in a v shape with respect to the longitudinal central axis of the vehicle, and the free ends of the diagonal struts are arranged at a distance on each side of the longitudinal central axis of the vehicle.

In order to reinforce the bodywork further, the free ends of the diagonal struts are attached, using screw devices, in a transverse member which is secured on a soft top storage compartment of the vehicle body. Forces which have been applied via the diagonal struts are respectively transmitted by the transverse member from one side of the vehicle to the opposite side of the vehicle, with the result that the torsional strength of the bodywork is improved to an optimum degree.

According to the invention there is also provision that the ends of the diagonal struts which face away from the free ends are secured in a fitting on the rollover protection device using screw devices and the fitting is arranged on the rollover protection device for connecting to the diagonal struts above the fitting for connecting the lateral stays to the rollover protection device. The diagonal struts and the lateral stays can therefore be connected to the rollover protection device and to the vehicle body using a simple mounting method.

Other features which are considered as characteristic for the invention are set forth in the appended claims.

Although the invention is illustrated and described herein as embodied in a vehicle body of a convertible vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
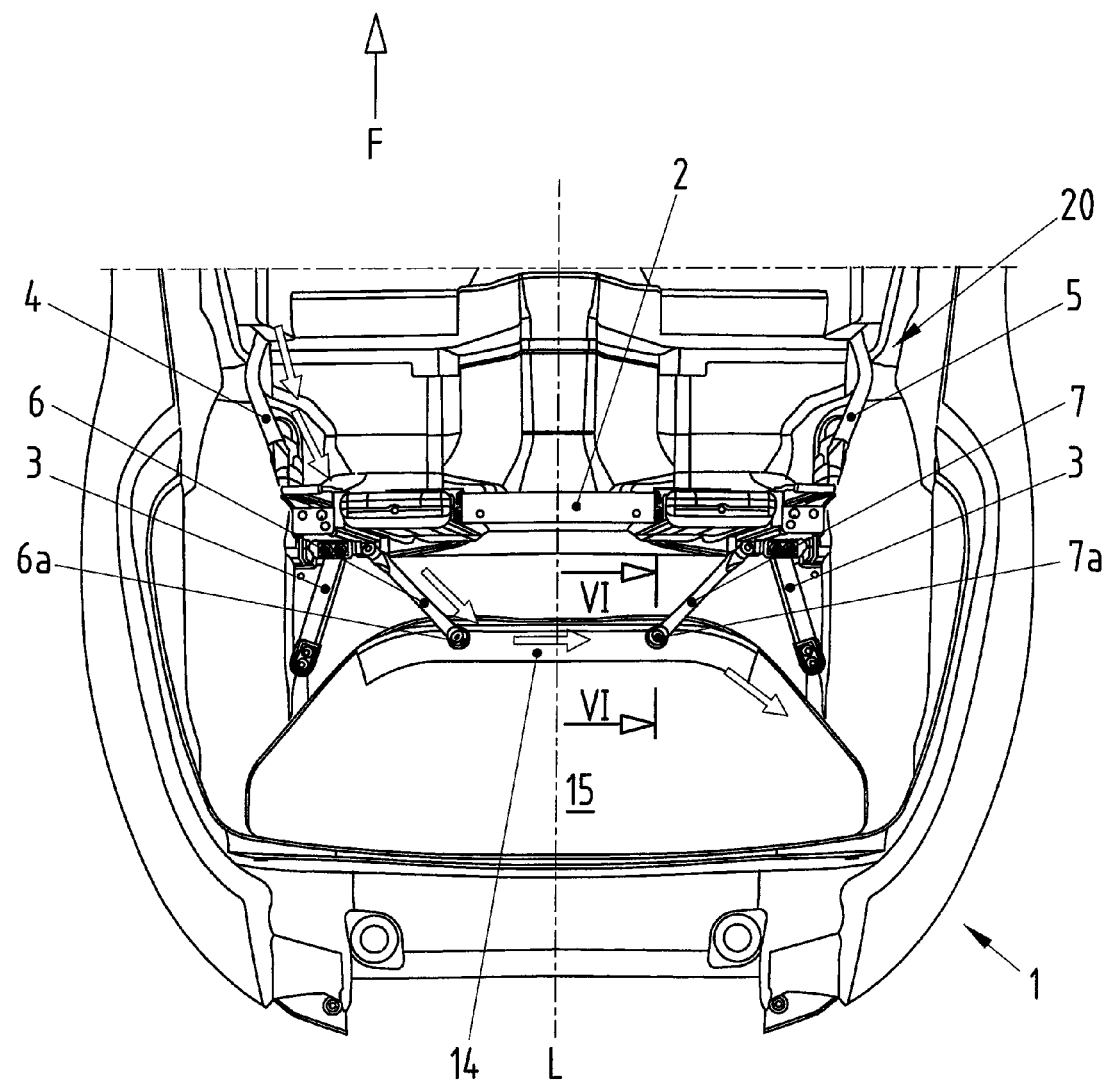
FIG. 1 is a diagrammatic, partial plan view of a convertible vehicle with an integrated rollover protection device and diagonal struts and lateral stays according to the invention.

Referring now to the figures of the drawing in detail and first, particularly, to FIG. 1 thereof, there is shown a vehicle body 1 of a convertible vehicle that has a rear part with a rollover protection device 2 which is arranged running transversely in the vehicle and is connected to the bodywork. Support is provided in the vehicle, on each side of the vehicle, by supporting stays 3 which are disposed on edge sides S of the rollover protection device 2, when viewed in a direction of travel F.

Figure 2:
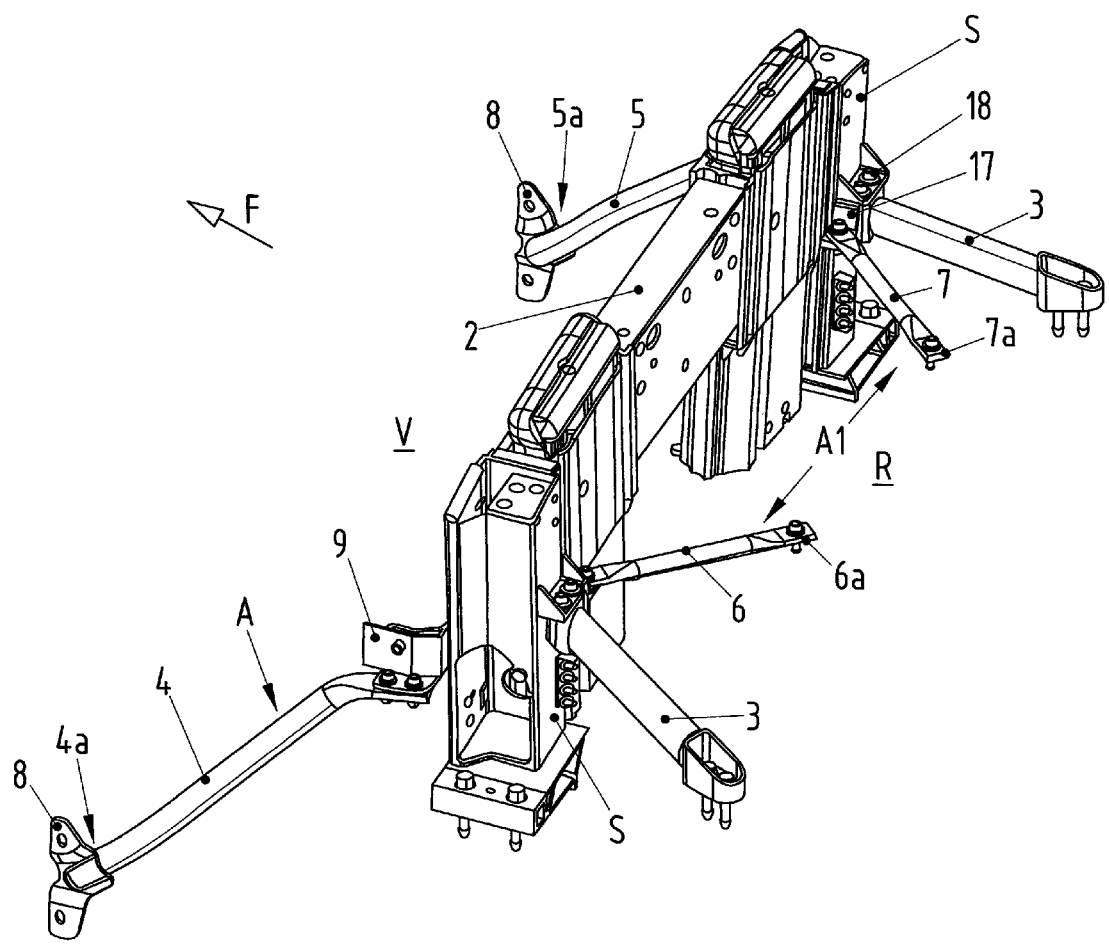
FIG. 2 is a perspective view of the rollover protection device with the diagonal struts and the lateral stays.

Reinforcement elements A and A1 are arranged at each outer side with the rollover protection device 2, at a front side V and at a rear side R when viewed in the direction of travel F (see FIG. 2). The reinforcement elements A at the front side V of the rollover protection device 2 are composed of two lateral stays 4, 5, and the further reinforcement elements A1 at the rear side R of the rollover protection device 2 are composed of two diagonal struts 6, 7. The lateral stays 4, 5 and the diagonal struts 6, 7 are each connected to the rollover protection device 2 and are each secured supported on the vehicle body 1 by their free ends which face away.

Figure 7:
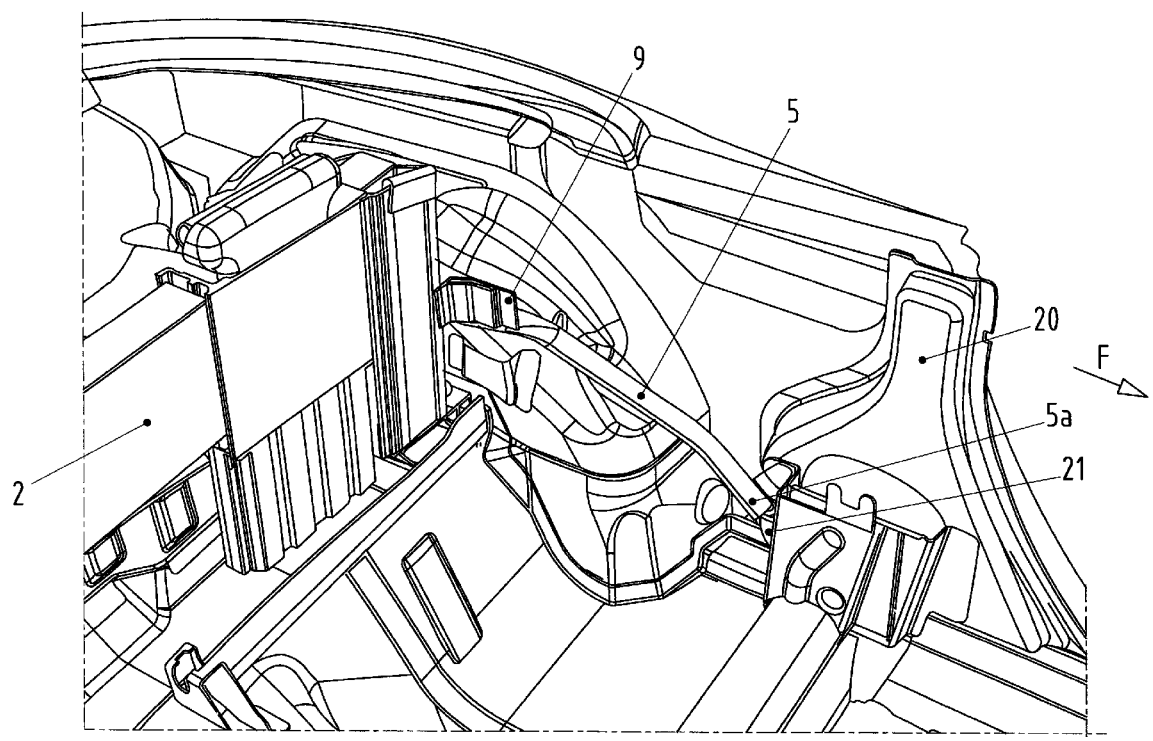
FIG. 7 is a perspective view of a B pillar with connected lateral stays.

The lateral stays 4, 5 of the reinforcement elements A extend from the edge side S of the rollover protection device 2 obliquely with respect to the outside of the vehicle to a base 21 of a B pillar 20 of the vehicle body 1 (see FIG. 7). Overall, the two lateral stays 4, 5 form an arrangement which is oriented in a v shape, when viewed from the rollover protection device 2 in the direction of travel F.

Free ends 4a and 5a of the lateral stays 4, 5 are connected both to the B pillar 20 and to the rollover protection device 2 using screw devices 10, 11 and in each case by of a fitting 8 and 9.

Figure 4:
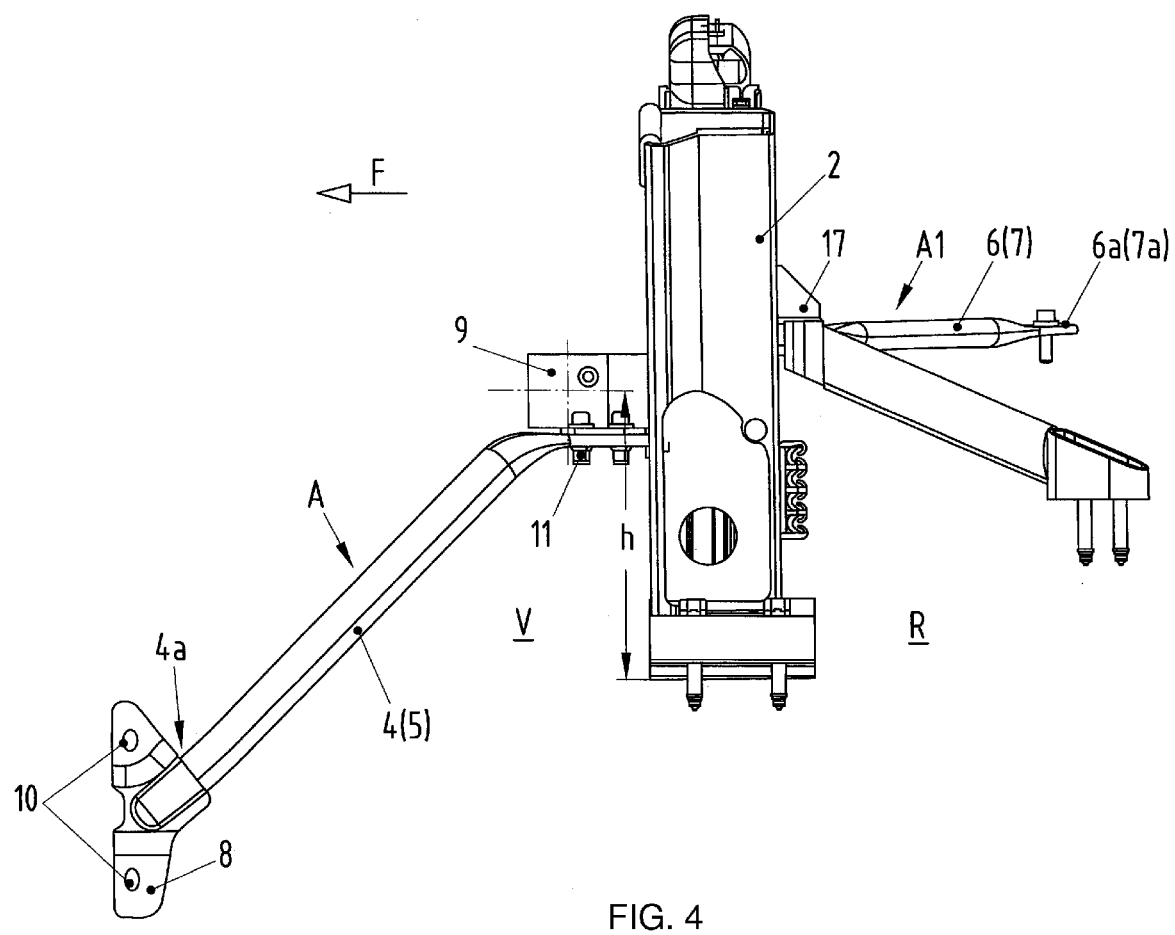
FIG. 4 is a side view of the rollover protection device according to FIG. 3.

The lateral stays 4, 5 are secured by a fitting 9 to the rollover protection device 2, approximately at half a height h on the edge side S in the fitting 9 (see FIG. 4). The lateral stays 4, 5 extend from the fitting 9 approximately at an angle of 45° obliquely downward to the base 21 of the B pillar 20 and are secured thereto by a fitting 8.

Figure 5:
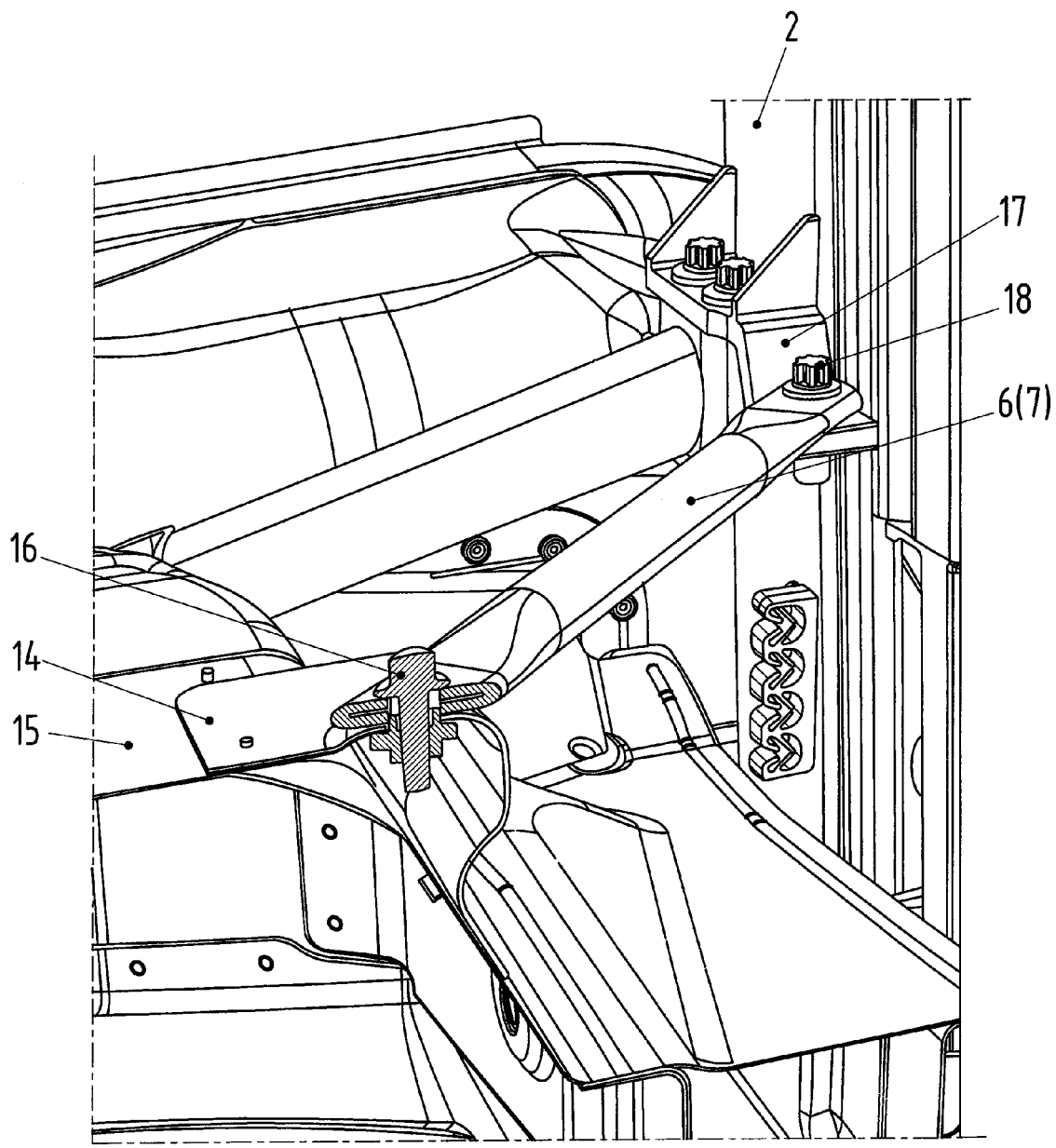
FIG. 5 is a perspective view of a screw connection of the diagonal strut to a transverse member of the vehicle body.
Figure 6:
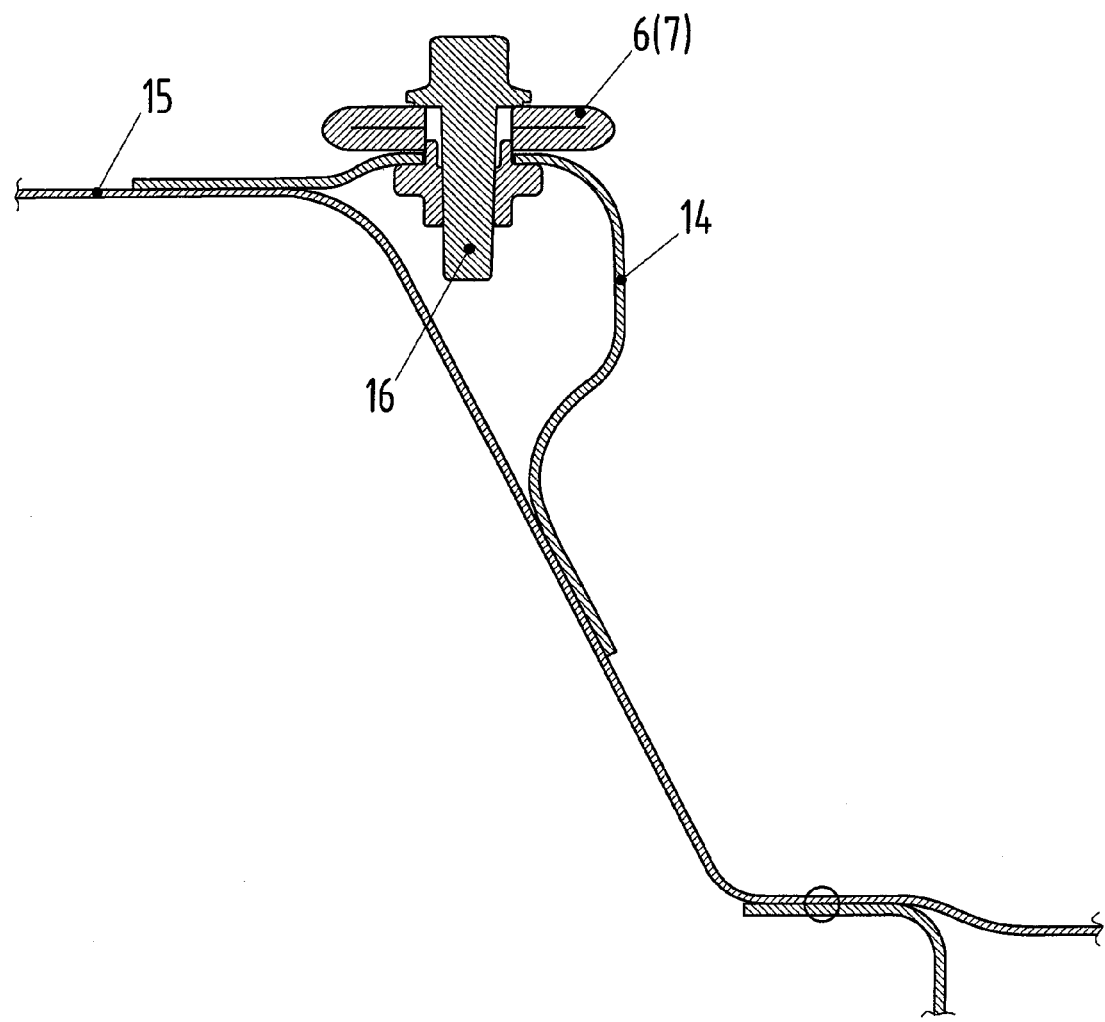
FIG. 6 is a sectional view through the screw connection taken along the line VI-VI shown in FIG. 1.

The diagonal struts 6, 7 of the reinforcement elements A1 at the rear side R of the rollover protection device 2 extend from the edge side S of the rollover protection device 2 obliquely in a direction of a longitudinal central axis L of the vehicle. Free ends 6a and 7a of the diagonal struts 6, 7 are connected using screws 16 to a transverse member 14, which is secured to a soft top storage compartment 15 (see FIGS. 5 and 6).

Figure 3:
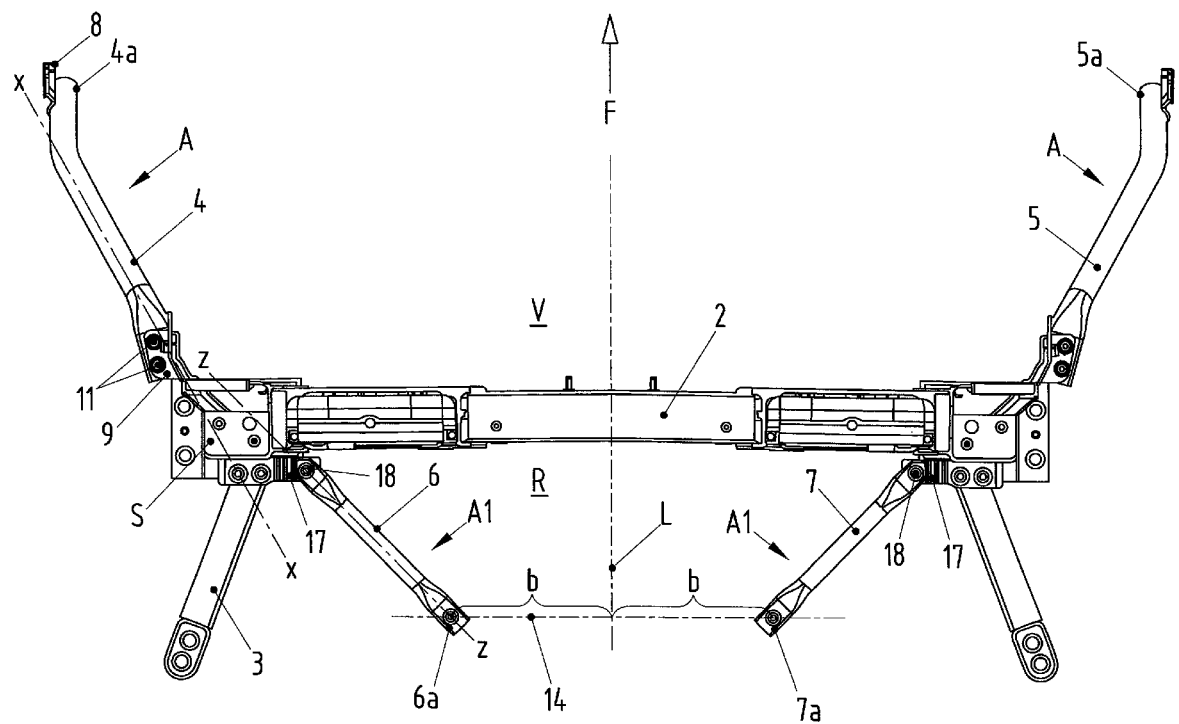
FIG. 3 is a plan view of the rollover protection device according to FIG. 2.

The diagonal struts 6, 7 extend in a v shape from the transverse member 14 to the rollover protection device 2 and are connected thereto by fittings 17 and using screw devices 18 (see FIG. 3). The diagonal struts 6, 7 are positioned at an angle of approximately 45° with respect to the rollover protection device 2, and the free ends 6a and 7a are arranged at a distance b on each side of the longitudinal central axis L of the vehicle.

The diagonal struts 6, 7 run approximately horizontally from the fitting 17 on the rollover protection device 2 as far as the transverse member 14 and the fitting 17 is arranged above the fitting 9 for the lateral stays 4, 5. The stays 4, 5 are arranged in a vertical oblique plane x-x which merges, in terms of direction, with a further vertical oblique plane z-z in which the diagonal struts 6, 7 are arranged, with the result that, as is indicated by arrows in FIG. 1, the force profile extends via the lateral stays 4, 5 and via the rollover protection device 2 into the diagonal struts 6, 7 and from here passes into the transverse member 14 to the respective other side of the vehicle's bodywork, and torsional support is provided.

The diagonal struts 4, 5 and the lateral stays 6, 7 are composed of metallic tubes which are partially flattened for connecting to the fittings.

The invention claimed is:

1. A vehicle body configuration for a convertible vehicle, the vehicle body configuration comprising:
   a vehicle body;
   reinforcing elements;
   a rollover protection device disposed running transversely and secured supported on said vehicle body, said rollover protection device connected on both sides to said reinforcement elements, said reinforcement elements are composed, at a rear side of said rollover protection device when viewed in a direction of travel, of at least two diagonal struts extending toward one another, said reinforcement elements are composed, at a front side of said rollover protection device when viewed in the direction of travel, of at least two lateral stays disposed diverging from one another, said diagonal struts and said lateral stays are connected supported on said vehicle body; and
   a B pillar, said lateral stays are disposed running from said rollover protection device as far as said B pillar, said lateral stays having free ends secured both to said rollover protection device and to said B pillar.

2. The vehicle body configuration according to claim 1, wherein said diagonal struts and said lateral stays are disposed oriented in a same direction in vertical oblique planes running obliquely from an outside of the convertible vehicle as far as a direction of a longitudinal central axis of the convertible vehicle.

3. The vehicle body configuration according to claim 1, wherein said lateral stays are disposed running obliquely outward in a v shape from said rollover protection device as far as said B pillar.

4. A vehicle body configuration for a convertible vehicle, the vehicle body configuration comprising:
   a vehicle body;
   reinforcing elements;
   a rollover protection device disposed running transversely and secured supported on said vehicle body, said rollover protection device connected on both sides to said reinforcement elements, said reinforcement elements are composed, at a rear side of said rollover protection device when viewed in a direction of travel, of at least two diagonal struts extending toward one another, said reinforcement elements are composed, at a front side of said rollover protection device when viewed in the direction of travel, of at least two lateral stays disposed diverging from one another, said diagonal struts and said lateral stays are connected supported on said vehicle body;

a B pillar, said lateral stays disposed running obliquely outward in a v-shape from said rollover protection device as far as said B pillar; and fittings, said lateral stays have free ends secured both to said rollover protection device and to said B pillar, in each case by one of said fittings.

5. The vehicle body configuration according to claim 4, wherein:
said B pillar has a base; and
said lateral stays extend obliquely downward from attachment in said fitting on said rollover protection device to said base of said B pillar.

6. The vehicle body configuration according to claim 5, wherein said fittings for attaching said lateral stays is disposed on said rollover protection device, at half a height of said rollover protection device, and at a side edge of said rollover protection device.

7. The vehicle body configuration according to claim 5, wherein said diagonal struts each extend obliquely with respect to a longitudinal central axis of the convertible vehicle in a v shape from an edge side of said rollover protection device, and said diagonal struts have free ends disposed at a distance on each side of the longitudinal central axis of the convertible vehicle.

8. The vehicle body configuration according to claim 7, further comprising:
a transverse member;
a soft top storage compartment for said vehicle body; and
screw devices, said free ends of said diagonal struts are attached, using said screw devices, in said transverse member which is secured on said soft top storage compartment.

9. The vehicle body configuration according to claim 7, further comprising screw devices;
wherein said rollover protection device has a further fitting; and
wherein said diagonal struts have further ends which face away from said free ends of said diagonal struts and are secured in said further fitting on said rollover protection device using said screw devices.

10. The vehicle body configuration according to claim 9, wherein said further fitting is disposed on said rollover protection device for connecting to said diagonal struts above said fittings for connecting said lateral stays to said rollover protection device.

11. The vehicle body configuration according to claim 8, wherein in a case of torsional loads, reinforcement can be applied to said vehicle body preliminary via said lateral stays and said diagonal struts as well as via said transverse member as a diagonal force path in relation to a respectively opposite side of said vehicle body.

12. The vehicle body configuration according to claim 1, wherein said diagonal struts and said lateral stays are composed of metallic tubular elements and partially have flattened portions at their ends for attachment purposes.

\* \* \* \* \*

UNITED STATES PATENT AND TRADEMARK OFFICE
Certificate

Patent No. 7,938,446 B2                                              Patented: May 10, 2011

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Hans-Jürgen Schmitt, Muehlacker (DE); Ali Oezkan, Leonberg (DE); and Josip Vlahovic, Freiberg am Neckar (DE).

Signed and Sealed this Twenty-first Day of October 2014.

PAUL N. DICKSON
*Supervisory Patent Examiner*
Art Unit 3616
Technology Center 3600